United States Patent
Lan

(10) Patent No.: US 12,443,247 B2
(45) Date of Patent: Oct. 14, 2025

(54) CONNECTING ELEMENT FOR HEAT DISSIPATION UNIT AND HEAT DISSIPATION UNIT USING SAME

(71) Applicant: ASIA VITAL COMPONENTS CO., LTD., New Taipei (TW)

(72) Inventor: Wen-Ji Lan, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 296 days.

(21) Appl. No.: 18/202,960

(22) Filed: May 29, 2023

(65) Prior Publication Data
US 2024/0402769 A1 Dec. 5, 2024

(51) Int. Cl.
| | | |
|---|---|---|
| *H01L 23/40* | (2006.01) | |
| *G06F 1/18* | (2006.01) | |
| *G06F 1/20* | (2006.01) | |
| *F16B 41/00* | (2006.01) | |

(52) U.S. Cl.
CPC .......... *G06F 1/183* (2013.01); *G06F 1/20* (2013.01); *H01L 23/4006* (2013.01); *F16B 41/002* (2013.01)

(58) Field of Classification Search
CPC ... F16B 41/002; F16B 21/186; F16F 2226/04; H01L 2023/4087; H01L 23/4006
USPC ......................................... 411/999, 352, 353
See application file for complete search history.

(56) References Cited

U.S. PATENT DOCUMENTS

| | | | | |
|---|---|---|---|---|
| 2,831,520 A | * | 4/1958 | Clarke ................. | F16B 5/0208 292/251 |
| 6,468,011 B2 | * | 10/2002 | Mayer ................... | F16B 21/18 411/153 |
| 6,786,691 B2 | * | 9/2004 | Alden, III ............ | F16B 41/002 411/352 |

(Continued)

FOREIGN PATENT DOCUMENTS

| | | |
|---|---|---|
| CN | 111577744 A | 8/2020 |
| TW | 281257 U | 7/1996 |

(Continued)

OTHER PUBLICATIONS

Search Report dated Dec. 17, 2023 issued by Taiwan Intellectual Property Office for counterpart application No. 112117162.

*Primary Examiner* — Flemming Saether
(74) *Attorney, Agent, or Firm* — Bradley J. Thorson; DeWitt LLP

(57) ABSTRACT

A heat dissipation unit is connected to a bare die heat source by extending connecting elements through four predetermined corners on the heat dissipation unit. The connecting elements respectively include a screw having a spring fitted therearound; a sleeve defining a receiving space for receiving the screw and the spring therein, and having a window formed near an upper end thereof to radially communicate with the receiving space; and a turnable retaining ring fitted around the upper end of the sleeve and including a tongue curled toward a center of the turnable retaining ring and being extendable through the window into the receiving space to compress the spring. When all the turnable retaining rings are turned, the tongues can be moved away from the springs, allowing the springs to release their elastic force synchronously and push the heat dissipation unit toward the bare die heat source evenly for heat exchange.

7 Claims, 7 Drawing Sheets

(56) References Cited

U.S. PATENT DOCUMENTS

| | | | | |
|---|---|---|---|---|
| 6,829,143 | B2* | 12/2004 | Russell | H01L 23/4006 257/714 |
| 6,955,512 | B2* | 10/2005 | Allen | H05K 7/14 211/26 |
| 7,817,427 | B2 | 10/2010 | Li et al. | |
| 10,943,848 | B1* | 3/2021 | Yatskov | H01L 23/4006 |
| 2024/0401633 | A1* | 12/2024 | Lan | F16B 41/002 |
| 2024/0402766 | A1* | 12/2024 | Lan | G06F 1/183 |

FOREIGN PATENT DOCUMENTS

| | | |
|---|---|---|
| TW | M325715 U | 1/2008 |
| TW | M644631 U | 8/2023 |

* cited by examiner

CONNECTING ELEMENT FOR HEAT DISSIPATION UNIT AND HEAT DISSIPATION UNIT USING SAME

FIELD OF THE INVENTION

The present invention relates to a connecting element for heat dissipation unit, and more particularly, to a plurality of connecting elements mounted on a heat dissipation unit and capable of applying evenly distributed downward elastic forces synchronously to push the heat dissipation unit toward a bare die heat source, such that the bare die heat source is not subjected to damage and heat resistance due to uneven contact with the heat dissipation unit.

BACKGROUND OF THE INVENTION

Nowadays, high performance and high power chips are used in electronic devices for the latter to provide highly enhanced computing power. The chip in processing data will produce a relatively high amount of heat to form a heat source. Conventionally, the chip is packaged or encapsulated to avoid the chip from being damaged. With the enhanced computing power thereof, the chip in processing data produces even more heat than ever before. However, the package of the chip adversely affects the produced heat from efficiently dissipating into outer environment. Therefore, many currently available chips are provided in the form of bare dies without any package to protect their surfaces. The non-packaged bare die has a non-smooth and convex surface and accordingly, has a relatively small and weak contact area between it and a heat dissipation device for heat exchange. Thus, the bare die is subjected to damage and breaking when the heat dissipation device is connected thereto.

Conventionally, to fix the heat dissipation device to a top of the heat source (i.e. the bare die), a plurality of fixing points on the heat dissipation device are sequentially screw tightened to the bare die one by one. Since the fixing points are not tightened synchronously, the heat dissipation device in contact with the heat source tends to be skewed relative to the latter. The bare die subjected to uneven distribution of pressure over it is easily broken and damaged.

Please refer to FIGS. 1 and 2, which show a conventional manner of fixing a heat dissipation device C to a heat source A in the form of a bare die. As shown, the bare die A is placed on a base D. Four corners of the base D correspondingly located outside the heat source A are provided with an internally threaded copper sleeve rod B each. The heat dissipation device C also has four holes C3 formed corresponding to the four copper sleeve rods B for a screw unit C1 to extend through each of the holes C3. Each of the screw units C1 has a spring C2 fitted therearound. To lay the heat dissipation device C to the top of the heat source A, the screw units C1 are sequentially threaded through the holes C3 into corresponding copper sleeve rods B one by one with a power screwdriver handled manually or by a mechanical arm. To shorten the fixing time on a production line and complete the fixing operation within a limited time period, each of the screw units C1 is fully tightened in one movement at a very quick speed. As soon as the screw unit C1 is fully tightened, the spring C2 fitted therearound is also compressed in a direction toward the heat source A. The screw units C1 individually tightened at a quick speed and the springs C2 quickly compressed toward the heat source A tend to result in uneven and asynchronous distribution of downward forces over four corners of the base D and accordingly, the heat source A. And, the heat source A, i.e. the bare die, being fragile and breakable, is easily damaged under uneven force application thereto.

The bare die is so fragile that even downward forces must be synchronously applied by the heat dissipation device to the four corners of the base carrying the bare die to ensure successful fixing of the heat dissipation device to the top of the bare die. In the event the four corners of the base are subjected to unevenly and asynchronously applied forces from the heat dissipation device, warp of the bare die or the heat dissipation device might occur to cause incomplete contact and thermal resistance between the two parts. In some worse conditions, the warped bare die might become damaged and non-usable and the thermal resistance might lead to uneven heat distribution over or inactive heat conduction of the heat dissipation device.

It is therefore tried by the inventor to find ways to enable the heat dissipation device to apply even and synchronous forces to the heat source to ensure complete and close contact between them, to maintain proper binding force between the bare die and the heat dissipation device with reliable fixing unit, and to make the fixing unit repeatedly usable or adjustable.

SUMMARY OF THE INVENTION

To effectively solve the problems in the prior art, it is a primary object of the present invention to provide a connecting element for heat dissipation unit, so that the heat dissipation unit can be pushed by synchronous and even downward forces from the connecting elements to contact with a bare die heat source without causing broken or collapsed edges of the bare die as would occur in the prior art where the fixing elements are tightened one by one to produce uneven downward forces toward the bare die heat source.

The connecting element according to the present invention includes a screw, a sleeve, and a turnable retaining ring.

The screw has a lower end provided with male threads, and including a retaining ring fitted on the screw axially closely above the male threads and a spring fitted around the screw. The spring has a top end and a bottom end, and the bottom end is pressed on one side of the retaining ring.

The sleeve has an open upper end, an open lower end, and a receiving space defined in the sleeve between and communicable with the upper and the lower end. A window is provided near the upper end of the sleeve to radially communicate with the receiving space. The screw and the spring are disposed in the receiving space of the sleeve.

The turnable retaining ring is fitted around the upper end of the sleeve and includes an annular member and at least one tongue extended from a lower rim of the annular member to curl toward a center of the turnable retaining ring clockwise or counterclockwise. The tongue can be extended through the window into the receiving space of the sleeve to press on the top end of the spring, so that the spring is held in the sleeve in a compressed state. When the turnable retaining ring is turned in an opposite direction, the tongue is brought to move out of the window, allowing the compressed spring to release its elastic restoring force.

To achieve the above and other objects, the present invention also provides a heat dissipation unit that can contact with a bare die heat source under even downward forces applied thereto by a plurality of connecting elements. The heat dissipation unit includes a heat dissipation main body.

The heat dissipation main body has a heat receiving zone, a plurality of through holes provided at four corners outside the heat receiving zone, and a plurality of connecting elements correspondingly mounted in the through holes.

To connect the heat dissipation main body to the bare die heat source, first align the heat receiving zone on the heat dissipation main body with the bare die heat source, and then the externally threaded lower ends of the screws of the connecting elements are extended through the through holes to screw into predetermined points on a substrate that carries the bare die heat source thereon, so that the connecting elements are preliminarily connected to the substrate. At this point, the springs are still compressed in the receiving spaces of the sleeves. When all the connecting elements mounted in the four corners outside the heat receiving zone are preliminarily connected to the substrate, the turnable retaining rings are turned to move the tongues away from the top ends of the springs and out of the windows on the sleeves, so that the springs are no longer pressed down by the tongues and synchronously release their elastic restoring forces to provide even downward forces to the four corners outside the heat receiving zone on the heat dissipation main body, pushing the heat dissipation main body to stably and closely contact with the bare die heat source. Therefore, the bare die is not subjected to broken or collapsed edges due to uneven or excessive forces applied thereto, nor would heat resistance occur due to incomplete contact of the heat dissipation main body with the bare die. Further, the present invention can also avoid the condition of broken and damaged heat source (i.e. the bare die) caused by excessive downward forces applied thereto during the process of tightening the connecting elements to the substrate.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
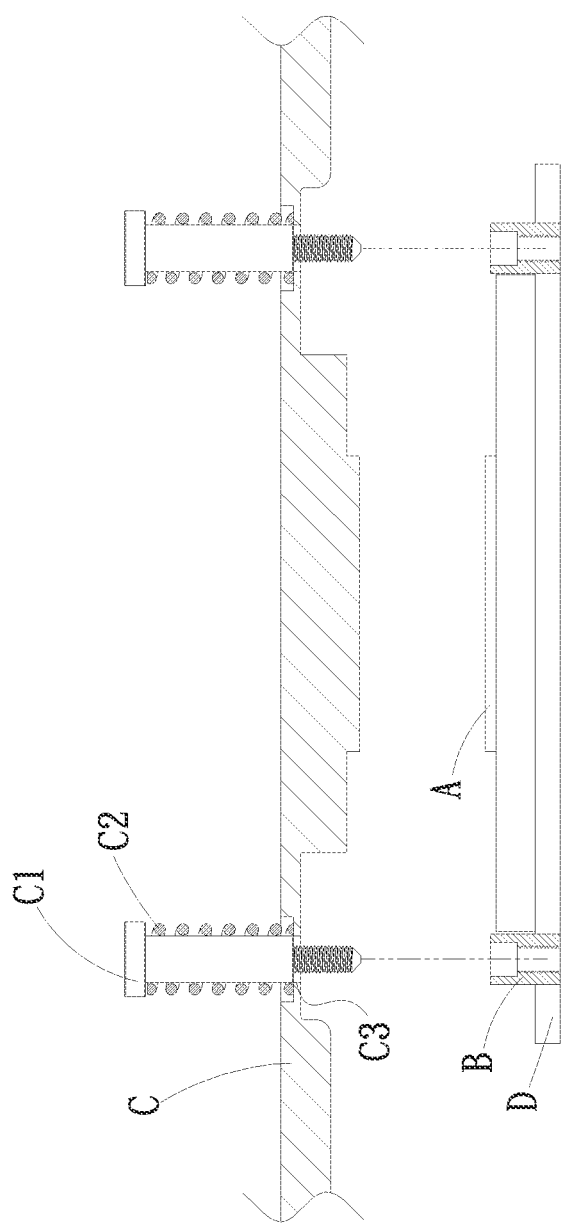
FIG. 1 shows how a heat dissipation unit is connected to a bare die in the prior art.
Figure 2:
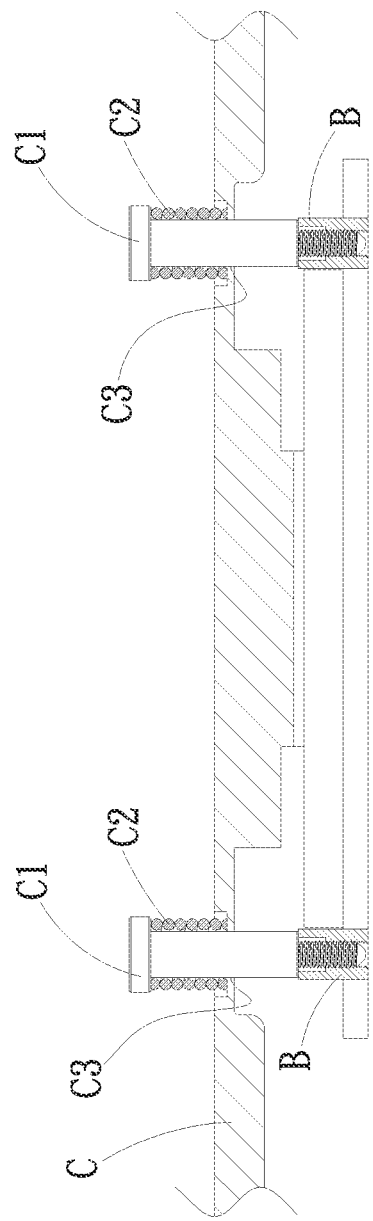
FIG. 2 shows the heat dissipation device and the bare die of FIG. 1 after being connected to each other.

The present invention will now be described with some preferred embodiments thereof. For the purpose of easy to understand, elements that are the same in the preferred embodiments are denoted by the same reference numerals.

Figure 3:
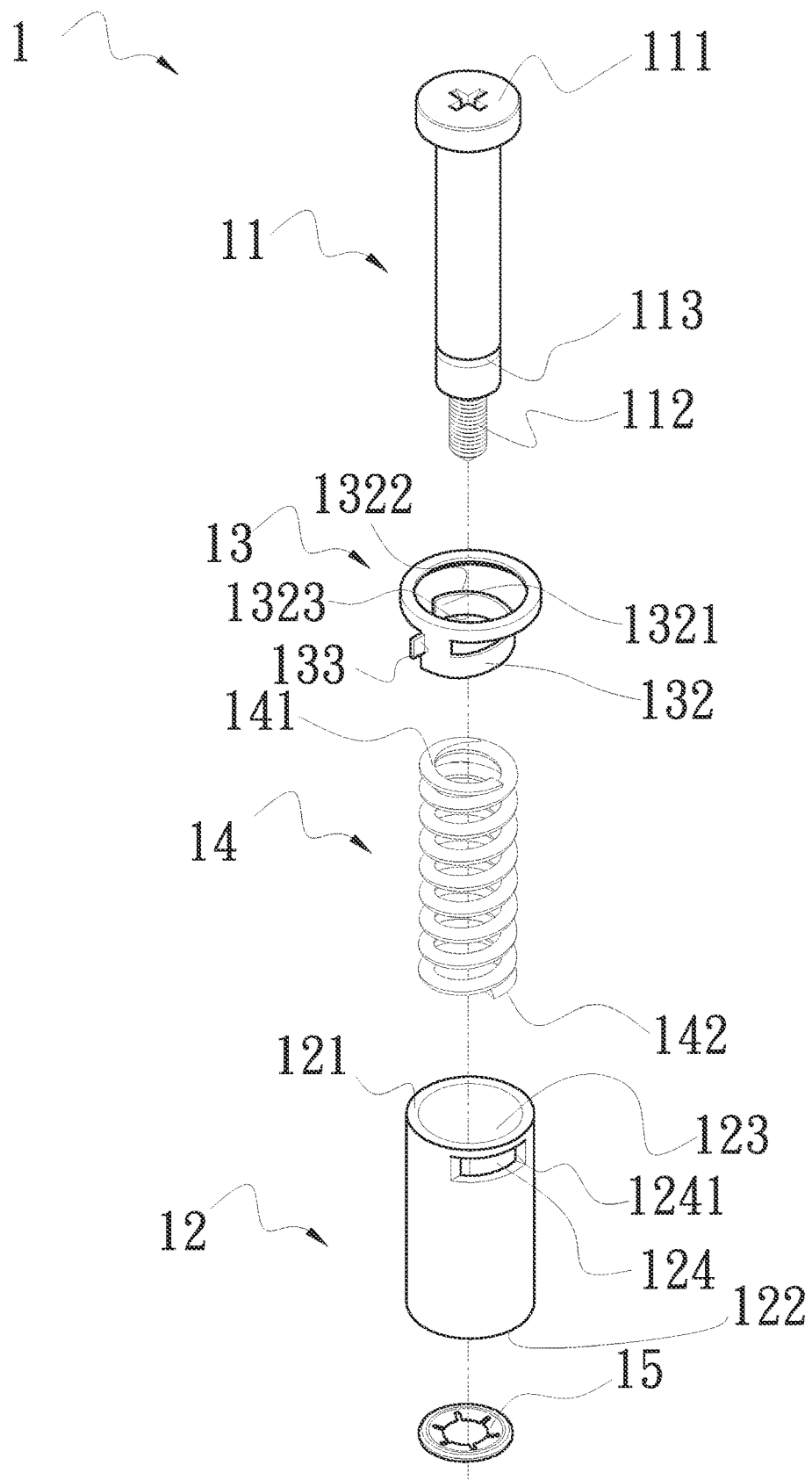
FIG. 3 is an exploded perspective view of a connecting element for heat dissipation unit according to a preferred embodiment of the present invention.
Figure 4:
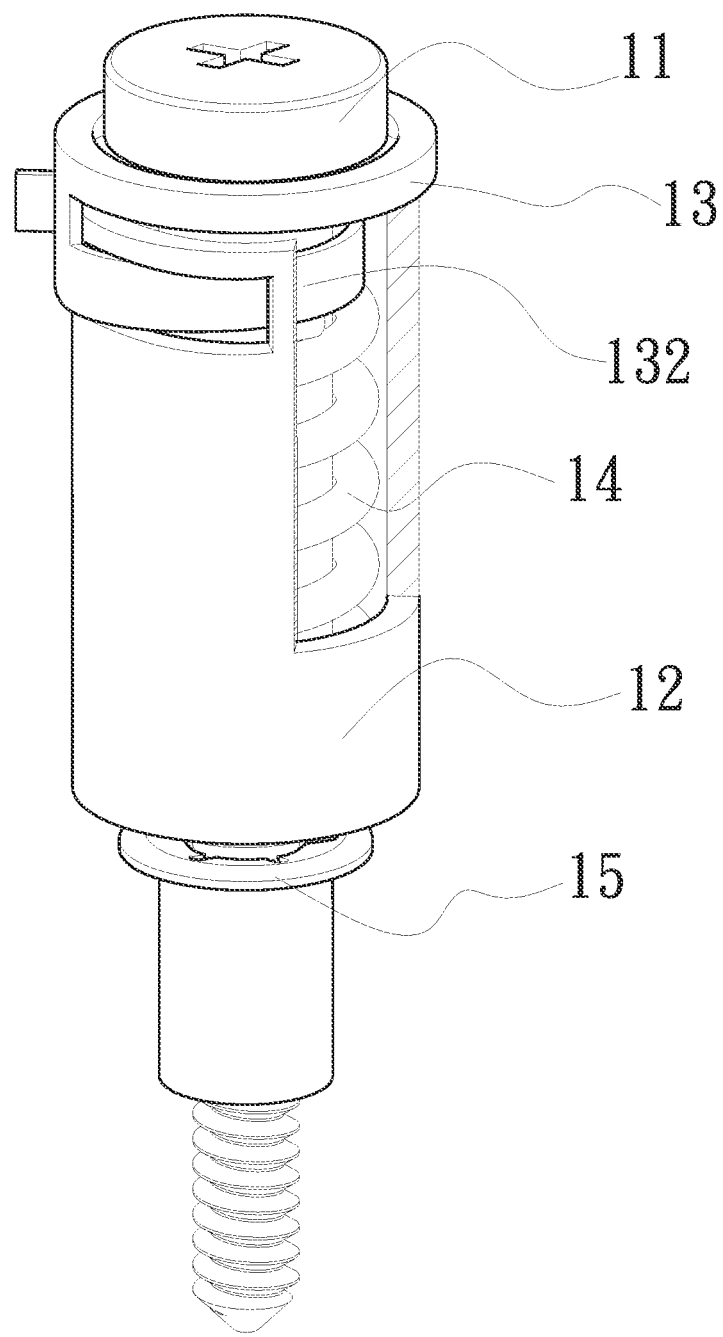
FIG. 4 is a cut away view of the connecting element of FIG. 3.

Please refer to FIGS. 3 and 4, which are exploded perspective view and cut away view, respectively, of a connecting element 1 for heat dissipation unit according to a preferred embodiment of the present invention. As shown, the connecting element 1 includes a screw 11, a spring 14, a sleeve 12, and a turnable retaining ring 13.

The screw 11 includes a screw head 111 and a plurality of male threads 112 provided at an upper and a lower end thereof, respectively, and an annular groove 113 formed axially closely above the male threads 112 for receiving a retaining ring 15 therein. The retaining ring 15 may be an E-ring or a C-ring. The spring 14 is fitted on around the screw 11 and has a top end 141 and a bottom end 142, and the bottom end 142 of the spring 14 is pressed on one side of the retaining ring 15, so that the spring 14 is stopped by the retaining ring 15 from moving down out of the screw 11 via the externally threaded lower end of the screw 11.

The sleeve 12 is a tube-like body internally defines a receiving space 123, and has an open upper end 121 and an open lower end 122. The receiving space 123 is located between and communicable with the upper and the lower end 121, 122. At least one horizontally extended window 124 is formed on the sleeve 12 near the upper end 121 to radially communicate with the receiving space 123. The screw 11 and the spring 14 are disposed in the receiving space 123 of the sleeve 12.

The turnable retaining ring 13 is an annular or a circular member, which is turnably fitted directly on or spaced from the upper end 121 of the sleeve 12. The turnable retaining ring 13 has an inner diameter larger than or equal to an outer diameter of the sleeve 12. In the illustrated preferred embodiment, the inner diameter of the turnable retaining ring 13 is larger than the outer diameter of the sleeve 12. The turnable retaining ring 13 is formed on a lower rim with a vertically downward extension section, which has a lower end further sidewardly extended and curled toward a center of the turnable retaining ring 13 to form at least one tongue 132. The tongue 132 may optionally turn toward the center of the turnable retaining ring 13 clockwise or counterclockwise to extend into the receiving space 123 via the window 124 on the sleeve 12 and press on the top end 141 of the spring 14, so that the spring 14 is held in the sleeve 12 in a compressed state.

There may be one or more tongues 132. In the case of having more than one tongue 132, the tongues 132 are arranged to curl toward the center of the turnable retaining ring 13 clockwise and counterclockwise alternately. The tongue 132 has a curled or spiral configuration, and has a radially inner surface 1321. When the turnable retaining ring 13 is turned, the tongue 132 can be extended into or moved out of the receiving space 123 of the sleeve 12 via the window 124.

The turnable retaining ring 13 can include at least one protruded section 133 formed on an outer surface of the extension section. A force can be conveniently applied at the protruded section to turn the turnable retaining ring 13; and a machine or a tool can be correspondingly engaged therewith for use. When the turnable retaining ring 13 is turned clockwise or counterclockwise, the tongue 132 is brought to extend into or move out of the receiving space 123 of the sleeve 12 via the window 124.

The window 124 on the sleeve 12 has an upper edge 1241, and the tongue 132 has an upper end surface 1322 and a lower end surface 1323. The tongue 132 is extended through the window 124 with its upper end surface 1322 pressed against the upper edge 1241 of the window 124 and its lower end surface 1323 pressed against the top end 141 of the spring 14, such that the tongue 132 is stopped by the window 124 from moving axially upward any further and the spring 14 is held by the tongue 132 in the receiving space 123 of the sleeve 12 in the compressed state.

Figure 5:
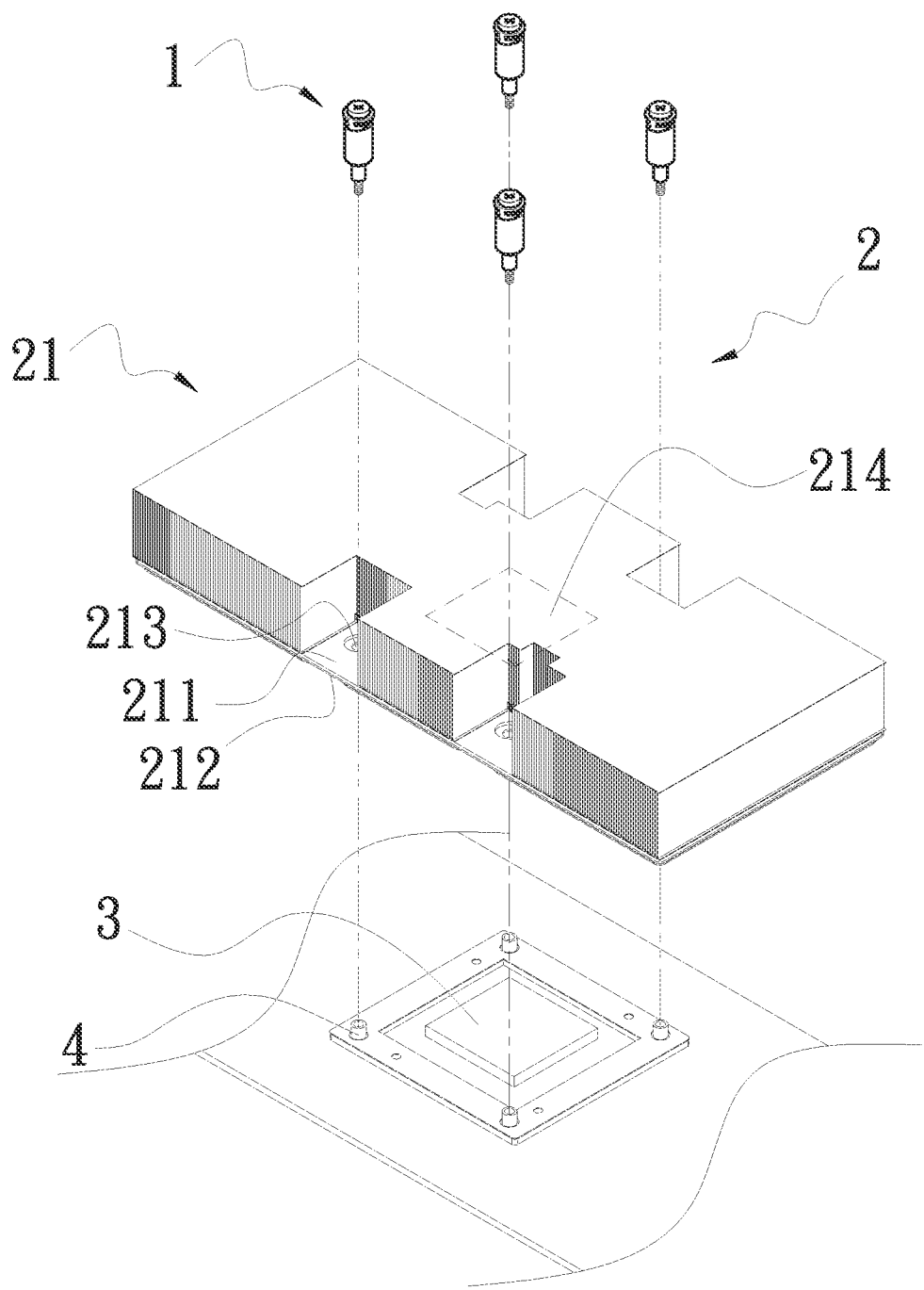
FIG. 5 is an exploded perspective view showing a heat dissipation unit according to the present invention and the use of the connecting elements of the present invention to connect the heat dissipation unit to a bare die heat source.
Figure 6:
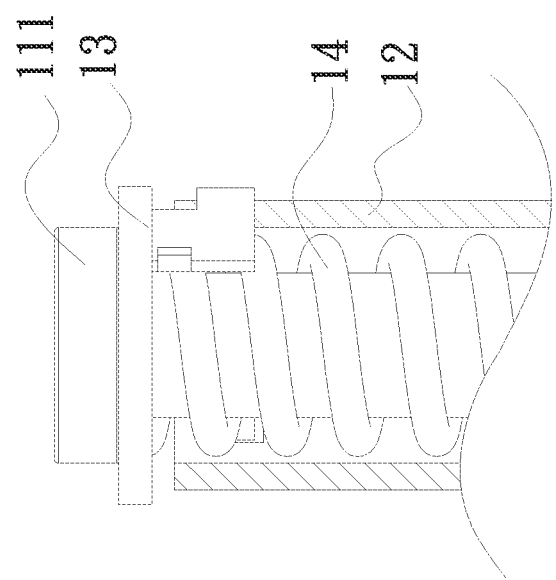
FIG. 6 includes sectional side views showing how the connecting element of the present invention works.
Figure 6:
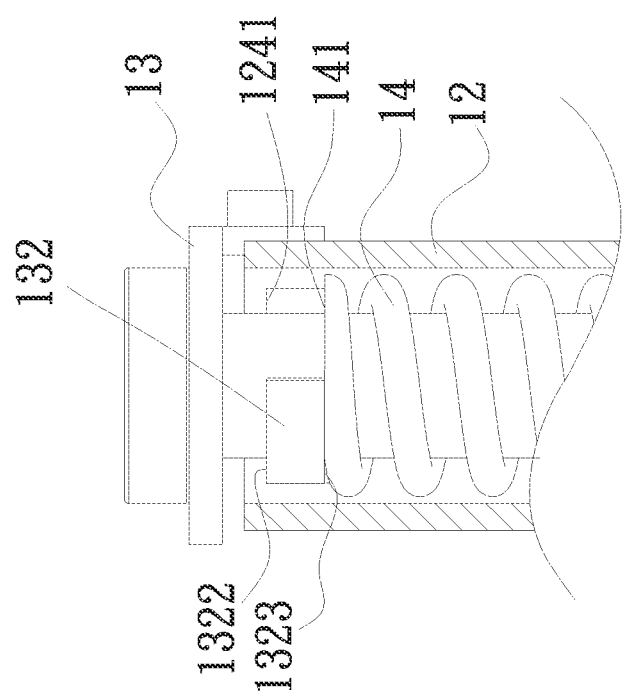
Figure 7:
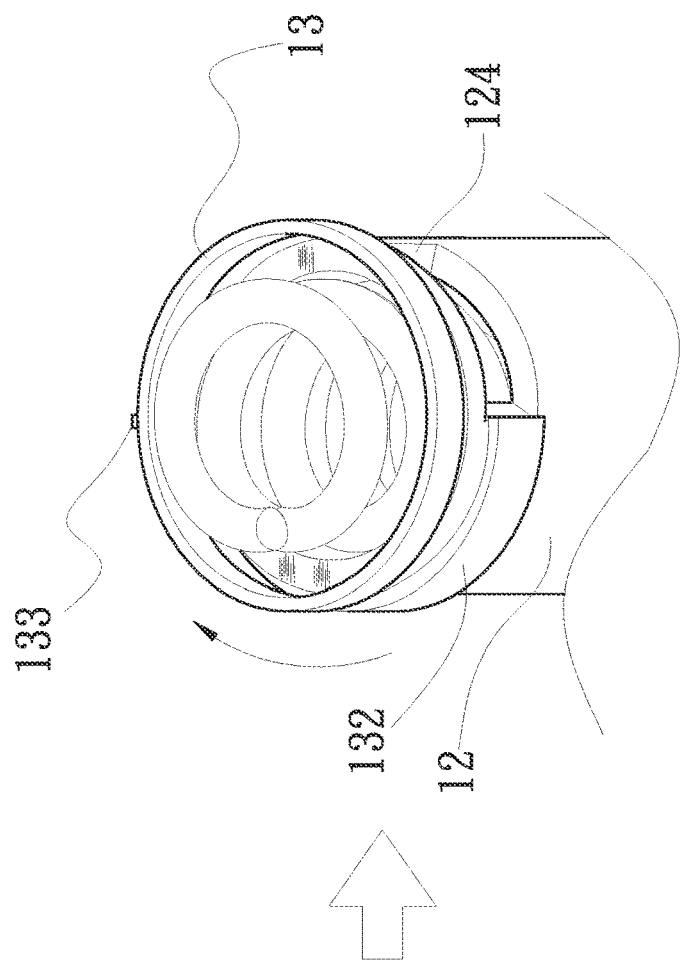
FIG. 7 includes perspective top views showing how the connecting element of the present invention works.
Figure 7:
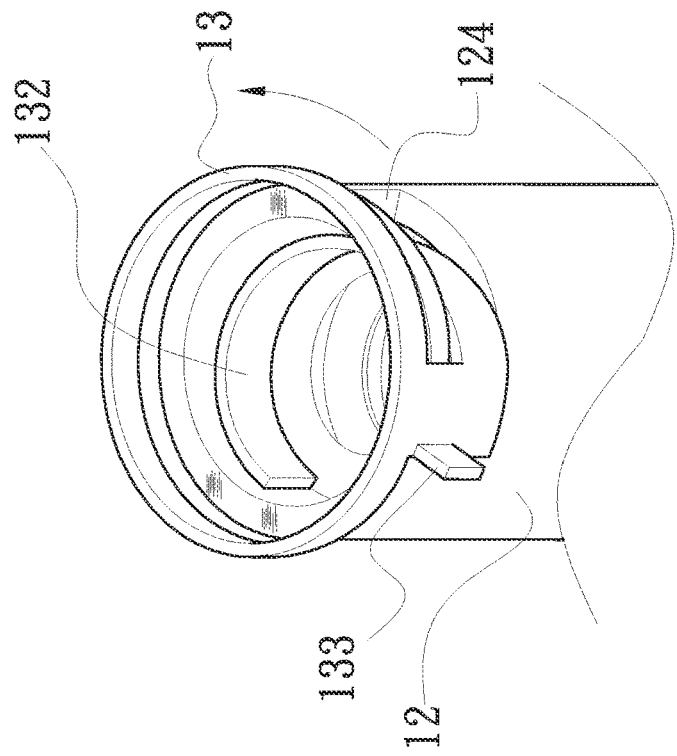

Please refer to FIG. 5, which shows a heat dissipation unit 2 according to the present invention to be connected to a bare die heat source 3 using the connecting elements 1 of the present invention; and to FIGS. 6 and 7, which are sectional views and perspective top views, respectively, showing how the connecting element 1 of the present invention works. As shown, a plurality of the connecting elements 1 of the present invention is used on the heat dissipation unit 2 for applying synchronous and even downward forces to push the heat dissipation unit 2 to closely contact with the bare die heat source 3. Since the structure of the connecting element 1 has been explained above with reference to FIGS. 3 and 4, it is not repeatedly described in detail herein.

The heat dissipation unit 2 includes a heat dissipation main body 21 having an upper side 211 and a lower side 212, at least four through holes 213, and a heat receiving zone 214 located near a central area of the lower side 212 of the heat dissipation main body 21. The four through holes 213 are located at four corners outside the heat receiving zone 213 to extend from the upper side 211 to the lower side 212 of the heat dissipation main body 21. The connecting elements 1 are correspondingly mounted in the through holes 213 with the externally threaded lower ends of the screws 11 downward extended beyond the lower side 212 of the heat dissipation main body 21. The retaining rings 15 are set in the annular grooves 113 of the screws 11 to upward abut on the lower side 212 of the heat dissipation main body 21, preventing the screws 11 from being pulled upward to separate from the through holes 213.

The screws 11 and the springs 14 are disposed in the receiving spaces 123 of the sleeves 12 with the top ends 114 of the springs 14 pressed against the tongues 132 of the turnable retaining rings 13, such that the springs 14 are elastically compressed in the receiving spaces 123 of the sleeves 12; meanwhile, the lower ends 122 of the sleeves 12 and the bottom ends 142 of the springs 14 are downward pressed against the upper sides 211 of the heat dissipation main body 21, bringing the connecting elements 1 to be assembled to the heat dissipation main body 21. In an alternative embodiment, the sleeve 12 is integrally formed on the upper side 211 of the heat dissipation main body 21, and all other parts of the connecting element 1 are inserted into or fitted on the sleeve 12 sequentially to assemble the connecting element 1 to the heat dissipation main body 21.

To connect the heat dissipation unit 2 to the bare die heat source 3 to achieve heat exchange or heat transfer between them, first align the connecting elements 1 with four holding structures 4 provided on a substrate that carries the bare die heat source 3 thereon. The holding structures 4 can be internally threaded sleeve rods, and the male threads 112 on the lower ends of the screws 11 can be preliminarily screwed into the holding structures 4. At this point, the springs 14 fitted on the screws 11 are still held to the compressed state without releasing any elastic force, and the heat dissipation unit 2 is only laid on the bare die heat source 3 without applying any pressure to the latter. That is, the heat receiving zone 214 on the lower side of the heat dissipation unit 2 is only in light contact with a top surface of the bare die heat source 3. For the heat dissipation unit 2 to move down toward the bare die heat source 3 evenly, the compressed springs 14 on the connecting elements 1 mounted in the four corners outside the heat receiving zone 214 must be elastically released synchronously, in order to apply synchronous and evenly distributed downward forces to the heat dissipation unit 2 and push the heat dissipation unit 2 against the bare die heat source 3 evenly.

To synchronously release the compressed springs 14 in the sleeves 12 of the connecting elements 1 for them to release their elastic restoring force at the same time, the turnable retaining rings 13 fitted on the sleeves 12 of the connecting elements are synchronously turned clockwise or counterclockwise using an automated apparatus (not shown) or manually with a hand tool, such that the tongues 132 of the turnable retaining rings 13 are brought to move away from the top ends 141 of the springs 14 synchronously, allowing the springs 14 to release their elastic restoring forces upward and downward at the same time, which provides synchronous and evenly distributed downward forces all over the heat dissipation unit 2, pushing the dissipation unit 2 toward the bare die heat source 3 stably without causing damaged bare die due to forces unevenly applied thereto by individual screws tightened one by one.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A connecting element for heat dissipation unit, comprising:
   a screw including a screw head and a plurality of male threads provided at an upper and a lower end thereof, respectively, a retaining ring located axially closely above the male threads, and a spring having a top end and a bottom end and being externally fitted on around the screw with the bottom end pressed against the retaining ring;
   a sleeve having an upper end, a lower end, and a receiving space located between and communicable with the upper and the lower end; the sleeve being provided near the upper end with at least one window, which is radially communicable with the receiving space in the sleeve; and the screw and the spring fitted thereon being disposed in the receiving space of the sleeve; and
   a turnable retaining ring being fitted on around the upper end of the sleeve and including an extension section downward extended from a lower rim thereof; a lower end of the extension section further sidewardly extended and curled toward a center of the turnable retaining ring to form at least one tongue; and the tongue being extended into the receiving space via the window of the sleeve to press on the top end of the spring, so that the spring is held between the retaining ring and the turnable retaining ring.

2. The connecting element for heat dissipation unit as claimed in claim 1, wherein the window on the sleeve has an upper edge and the tongue of the turnable retaining ring has an upper end surface and a lower end surface; the tongue being extended through the window with its upper end surface pressed against the upper edge of the window and its lower end surface pressed against the top end of the spring, such that the spring is held by the tongue in the receiving space of the sleeve in the compressed state.

3. The connecting element for heat dissipation unit as claimed in claim 1, wherein the turnable retaining ring further includes at least one protruded section formed on a radially outer surface thereof; and the turnable retaining ring being turnable when a force is applied to the protruded section.

4. A heat dissipation unit, comprising:
   a heat dissipation main body having an upper side, a lower side, at least four through holes, and a heat receiving zone; the through holes being located at four corners outside the heat receiving zone to extend from the upper side to the lower side of the heat dissipation main body; and the through holes respectively having a connecting element mounted therein; and
the connecting element including:
- a screw having a screw head and a plurality of male thread provided at an upper and a lower end thereof, respectively, and the lower end of the screw with the male threads being extended through one corresponding through hole on the heat dissipation main body; a retaining ring being fitted on the screw at a position axially closely above the male threads after the latter is extended through the through hole, such that the retaining ring has one side abutted on the lower side of the heat dissipation main body; and a spring fitted around the screw and having a top end and a bottom end, the bottom end of the spring abutting the retaining ring;
- a sleeve having an upper end, a lower end, and a receiving space defined between and communicable with the upper and the lower end; the sleeve being provided near the upper end with a window radially communicable with the receiving space; and the screw and the spring fitted thereon being disposed in the receiving space, such that the lower end of the sleeve and the bottom end of the spring are pressed on the upper side of the heat dissipation main body; and
- a turnable retaining ring being fitted around the upper end of the sleeve and including an extension section downward extended from a lower rim thereof; a lower end of the extension section further sidewardly extended and curled toward a center of the turnable retaining ring to form at least one tongue; and the tongue being extended into the receiving space via the window of the sleeve to press on the top end of the spring, such that the spring is held between the retaining ring and the turnable retaining ring.

5. The heat dissipation unit as claimed in claim 4, wherein the turnable retaining ring can be turned clockwise or counterclockwise for the tongue to extend into or move out of the receiving space of the sleeve, respectively.

6. The heat dissipation unit as claimed in claim 4, wherein the window on the sleeve has an upper edge and the tongue of the turnable retaining ring has an upper end surface and a lower end surface; the tongue being extended through the window with its upper end surface pressed against the upper edge of the window and its lower end surface pressed against the top end of the spring.

7. The heat dissipation unit as claimed in claim 4, wherein the turnable retaining ring further includes at least one protruded section formed on a radially outer surface thereof; and the turnable retaining ring being turnable when a force is applied to the protruded section.

\* \* \* \* \*